United States Patent
Chen et al.

(10) Patent No.: US 11,310,505 B2
(45) Date of Patent: Apr. 19, 2022

(54) METHOD AND APPARATUS FOR ADAPTIVE CONTEXT MODELING IN VIDEO ENCODING AND DECODING

(71) Applicant: InterDigital VC Holdings, Inc., Wilmington, DE (US)

(72) Inventors: Ya Chen, Cesson-Sevigne (FR); Fabrice Le Leannec, Cesson-Sevigne (FR); Tangi Poirier, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/040,023

(22) PCT Filed: Apr. 8, 2019

(86) PCT No.: PCT/US2019/026328
§ 371 (c)(1),
(2) Date: Sep. 21, 2020

(87) PCT Pub. No.: WO2019/209512
PCT Pub. Date: Oct. 31, 2019

(65) Prior Publication Data
US 2021/0021831 A1    Jan. 21, 2021

(30) Foreign Application Priority Data

Apr. 27, 2018 (EP) .................................... 18305534

(51) Int. Cl.
*H04N 19/13* (2014.01)
*H04N 19/159* (2014.01)
(Continued)

(52) U.S. Cl.
CPC ........... *H04N 19/13* (2014.11); *H04N 19/159* (2014.11); *H04N 19/176* (2014.11); *H04N 19/18* (2014.11)

(58) Field of Classification Search
CPC .... H04N 19/13; H04N 19/159; H04N 19/176; H04N 19/18; H04N 19/14; H04N 19/463
See application file for complete search history.

(56) References Cited

U.S. PATENT DOCUMENTS 9,584,812 B2   2/2017   Ji et al.
9,596,474 B2   3/2017   Lee et al.
(Continued)

FOREIGN PATENT DOCUMENTS

EP   1940176 A2   7/2008
EP   2618573 A1   7/2013
(Continued)

OTHER PUBLICATIONS

ITU-T, "High efficiency video coding", Series H: Audiovisual and Multimedia Systems, Infrastructure of audiovisual services—Coding of moving video, Recommendation ITU-T H.265, pp. 1-636, Apr. 2015.

(Continued)

*Primary Examiner* — Dramos Kalapodas
(74) *Attorney, Agent, or Firm* — Xiaoan Lu

(57) ABSTRACT

A significance-coefficient flag indicates whether a given quantized transform coefficient is equal to zero or not. To encode the significant-coefficient flags, context-based entropy coding can be used. To adapt to the characteristics of a video sequence, the context model is selected based on the statistics of the transform coefficients. In one embodiment, the non-zero probabilities of transform coefficients are compared to different thresholds to divide a transform block into several context regions, where all coefficients in a (Continued)

context region use the same set of context models. In another embodiment, the transform block is first divided into several context regions based on the positions of the transform coefficients, and the non-zero probabilities of transform coefficients are compared with a threshold to divide each context region into two sub-regions, where all coefficients in a sub-region share the same set of context models.

20 Claims, 12 Drawing Sheets

(51) Int. Cl.
*H04N 19/176* (2014.01)
*H04N 19/18* (2014.01)

(56) References Cited

U.S. PATENT DOCUMENTS

| | | | |
|---|---|---|---|
| 9,621,894 | B2 | 4/2017 | Seregin et al. |
| 9,621,984 | B1 | 4/2017 | Chu |
| 2013/0182758 | A1* | 7/2013 | Seregin ............... H04N 19/119 |
| | | | 375/240.02 |
| 2013/0182773 | A1* | 7/2013 | Seregin ............... H04N 19/91 |
| | | | 375/240.18 |
| 2013/0235925 | A1* | 9/2013 | Nguyen ............... H04N 19/182 |
| | | | 375/240.2 |
| 2013/0272379 | A1* | 10/2013 | Sole Rojals ......... H04N 19/176 |
| | | | 375/240.02 |
| 2014/0307801 | A1* | 10/2014 | Ikai ..................... H04N 19/124 |
| | | | 375/240.18 |
| 2015/0010078 | A1* | 1/2015 | Kumakura ........... H04L 65/607 |
| | | | 375/240.12 |
| 2016/0353113 | A1* | 12/2016 | Zhang .................. H04N 19/126 |
| 2017/0150185 | A1 | 5/2017 | Sze |
| 2021/0084304 | A1* | 3/2021 | Schwarz ............... H04N 19/132 |

FOREIGN PATENT DOCUMENTS

| | | |
|---|---|---|
| WO | WO9634495 A2 | 10/1996 |
| WO | WO9838800 A1 | 9/1998 |

OTHER PUBLICATIONS

Chiang et al., "A Constrained Adaptive Scan Order Approach To Transform Coefficient Entropy Coding", 2017 IEEE International Conference on Acoustics, Speech and Signal Processing, IEEE, New Orleans, LA, pp. 1298-1302, Mar. 5-9, 2017.

Chen et al., "Algorithm Description of Joint Exploration Test Model 3", Joint Video Exploration Team (JVET) of ITU-T SG 16 WP 3 and ISO/IEC JTC 1/SC 29/WG 11, Document: JVET-C1001_V3, pp. 1-34, 3rd Meeting: Geneva, CH, May 26-Jun. 1, 2016.

* cited by examiner

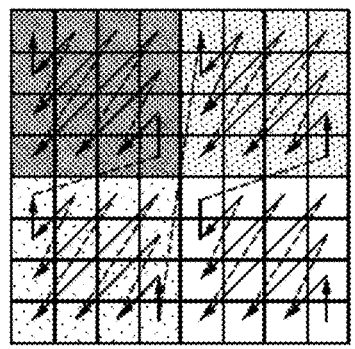 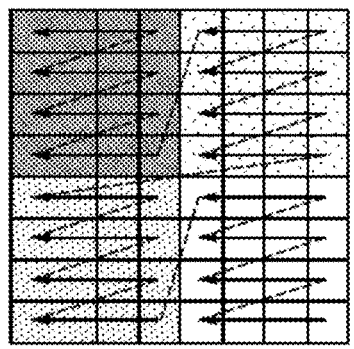 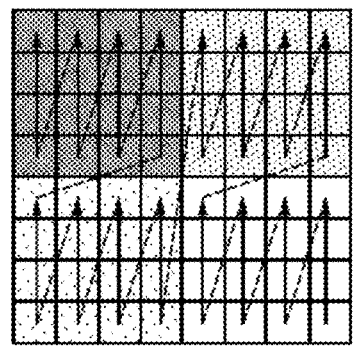
Diagonal  Horizontal  Vertical
FIG. 4A  FIG. 4B  FIG. 4C
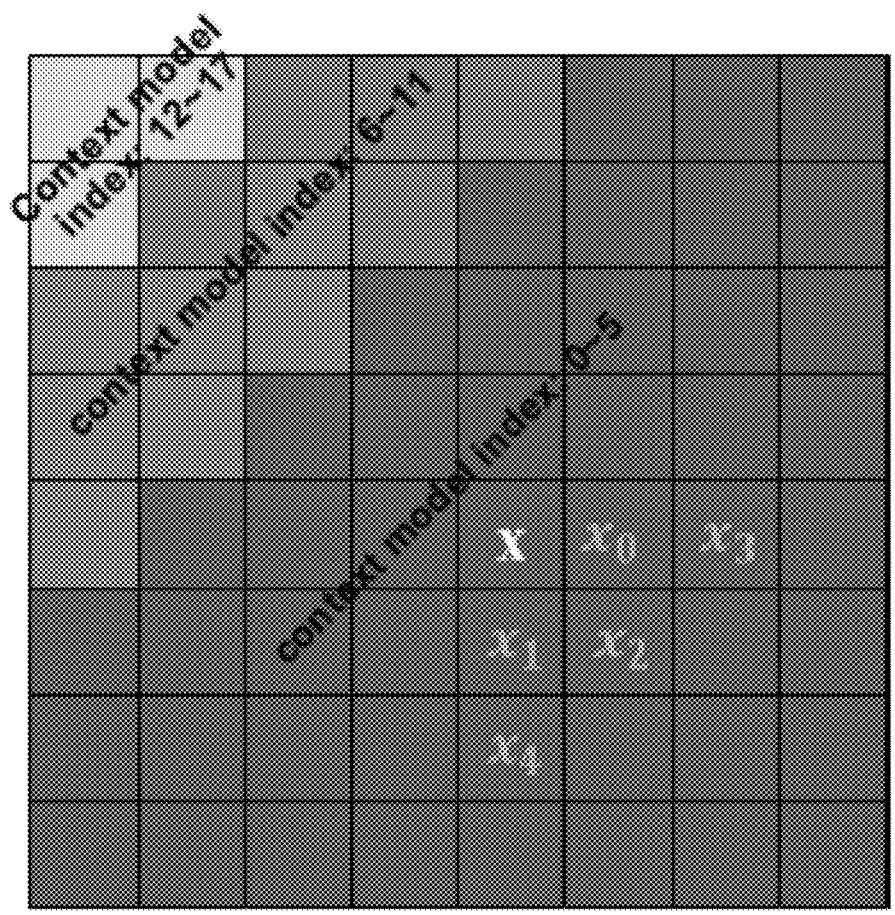
FIG. 5

METHOD AND APPARATUS FOR ADAPTIVE CONTEXT MODELING IN VIDEO ENCODING AND DECODING

This application claims the benefit, under 35 U.S.C. § 371 of International Application No. PCT/US2019/026328, filed Apr. 8, 2019, which was published on Oct. 31, 2019, which claims the benefit of European Patent Application No. EP18305534.2 filed Apr. 27, 2018.

TECHNICAL FIELD

The present embodiments generally relate to a method and an apparatus for video encoding or decoding, and more particularly, to a method and an apparatus for adaptive context modeling for entropy coding in video encoding or decoding.

BACKGROUND

To achieve high compression efficiency, image and video coding schemes usually to employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to is the entropy coding, quantization, transform, and prediction.

SUMMARY

According to a general aspect of at least one embodiment, a method for decoding video data is presented, comprising: accessing a probability of a quantized transform coefficient, of a block of a picture, being zero or non-zero; determining a context model for a syntax element associated with said quantized transform coefficient, responsive to said probability; entropy decoding said syntax element based on said context model; and decoding said quantized transform coefficient responsive to said decoded syntax element.

According to another general aspect of at least one embodiment, a method for encoding video data is presented, comprising: accessing a quantized transform coefficient of a block of a picture in a video; accessing a probability of said quantized transform coefficient being zero or non-zero; determining a context model for a syntax element associated with said quantized transform coefficient, responsive to said probability; and entropy encoding said syntax element based on said context model.

According to another general aspect of at least one embodiment, an apparatus for decoding video data is presented, comprising at least a memory and one or more processors, wherein said one or more processors are configured to: access a probability of a quantized transform coefficient, of a block of a picture, being zero or non-zero; determine a context model for a syntax element associated with said quantized transform coefficient, responsive to said probability; entropy decode said syntax element based on said context model; and decode said quantized transform coefficient responsive to said decoded syntax element.

According to another general aspect of at least one embodiment, an apparatus for encoding video data is provided, comprising at least a memory and one or more processors, wherein said one or more processors are configured to: access a quantized transform coefficient of a block of a picture in a video; access a probability of said quantized transform coefficient being zero or non-zero; determine a context model for a syntax element associated with said to quantized transform coefficient, responsive to said probability; and entropy encode said syntax element based on said context model.

According to another general aspect of at least one embodiment, an apparatus for decoding video data is presented, comprising: means for accessing a probability of a quantized transform coefficient, of a block of a picture, being zero or non-zero; means for determining a context model for a syntax element associated with said quantized transform coefficient, responsive to said probability; means for entropy decoding said syntax element based on said context model; and means for decoding said quantized transform coefficient responsive to said decoded syntax element.

According to another general aspect of at least one embodiment, an apparatus for encoding video data is presented, comprising: means for accessing a quantized transform coefficient of a block of a picture in a video; means for accessing a probability of said quantized transform coefficient being zero or non-zero; means for determining a context model for a syntax element associated with said quantized transform coefficient, responsive to said probability; and means for entropy encoding said syntax element based on said context model.

According to another general aspect of at least one embodiment, said determination of context model is responsive to a comparison between said probability and at least a first value.

According to another general aspect of at least one embodiment, said syntax element is indicative of (1) whether said quantized transform coefficient is zero or not, (2) whether an absolute value of said quantized transform coefficient is greater than 1, or (3) whether an absolute value of said quantized transform coefficient is greater than 2. According to another general aspect of at least one embodiment, a probability of said quantized transform coefficient being greater than one or two is accessed, More generally, said syntax element can indicate whether an absolute value of said quantized transform coefficient is greater than X, X being 0, 1, 2, 3 or another value.

According to another general aspect of at least one embodiment, CABAC (Context-Adaptive Binary Arithmetic Coding) is used for entropy encoding or decoding According to another general aspect of at least one embodiment, said context model is further responsive to a position of said quantized transform coefficient.

According to another general aspect of at least one embodiment, said context model is determined responsive to a comparison of (1) a sum of x-coordinate and y-coordinate of said quantized transform coefficient in said block and (2) at least a second value.

According to another general aspect of at least one embodiment, said block is divided into a plurality of context regions based on positions of transform coefficients of said block, wherein a context region is divided into two or more sub-regions based on probabilities on transform coefficients in said region, and wherein each sub-region shares a same set of context model indices.

According to another general aspect of at least one embodiment, said context model is further responsive to transform coefficients neighboring to said transform coefficient.

According to another general aspect of at least one embodiment, said probability is estimated based on one or more previous pictures of said picture.

According to another general aspect of at least one embodiment, said probability corresponds to at least one of (1) a size of said block, (2) a coding mode of said block; and (3) a prediction mode of said block.

According to another general aspect of at least one embodiment, a bitstream is formatted to include a syntax element associated with a quantized transform coefficient a block of a picture in a video, wherein said syntax element is entropy encoded based on a context model, and wherein said context model is determined responsive to a probability of said quantized transform coefficient being zero or non-zero.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting and receiving the bitstream generated according to the methods described above. The present embodiments also provide a computer program product including instructions for performing any of the methods described above.

BRIEF DESCRIPTION OF THE DRAWINGS

FIGS. 4A, 4B and 4C are pictorial examples depicting the scanning orders in HEVC.

FIG. 5 is a pictorial example depicting context regions and template in JEM.

DETAILED DESCRIPTION

Figure 1:
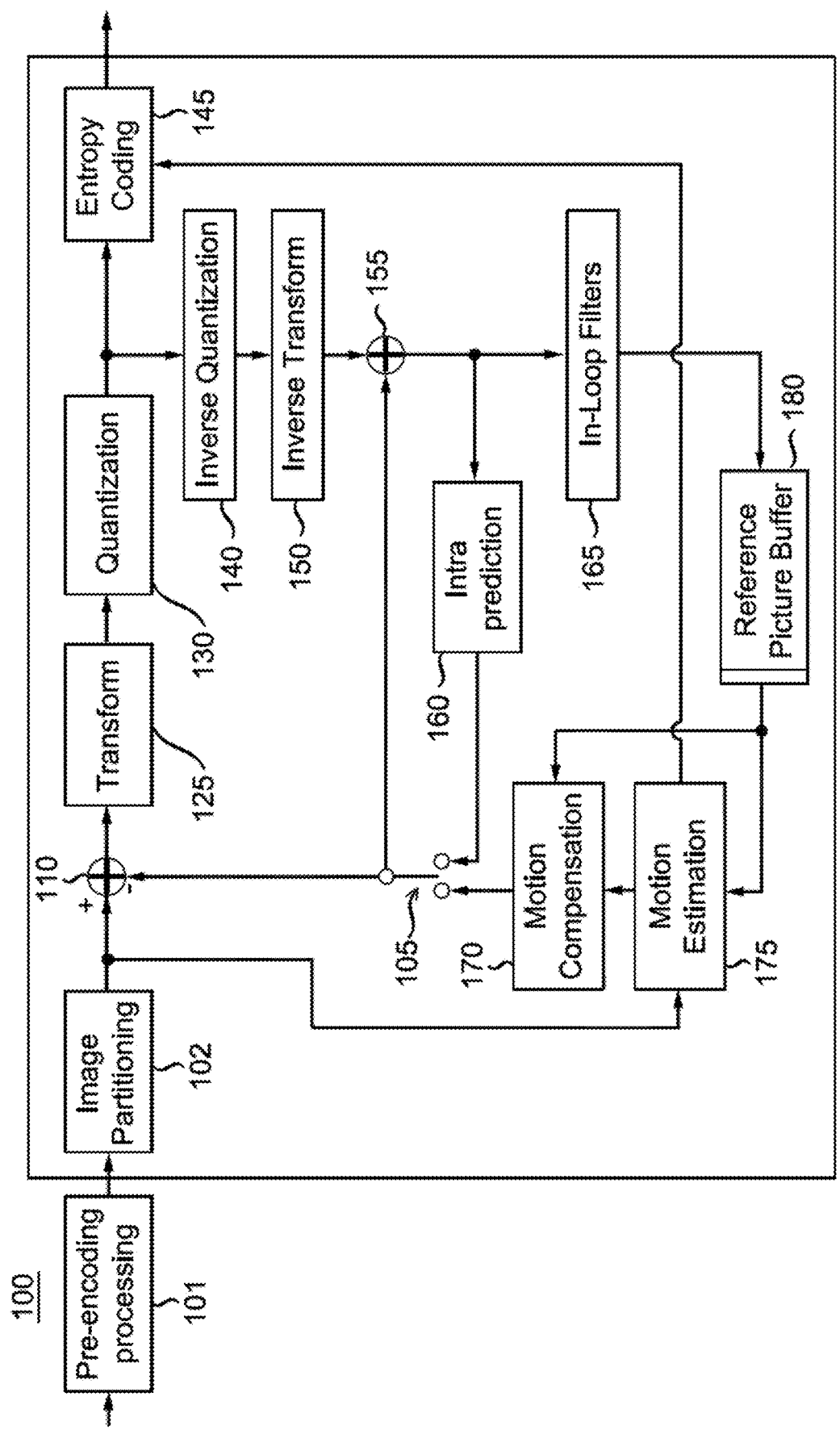
FIG. 1 illustrates a block diagram of an embodiment of a video encoder.

FIG. 1 illustrates an exemplary video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding according to HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of, for example, CUs. Each coding unit is encoded using either an intra or inter mode. When a coding unit is encoded in an intra mode, it performs intra prediction (160). In an inter mode, motion estimation (175) and compensation (170) are performed. The encoder decides (105) which one of the intra mode or inter mode to use for encoding the coding unit, and indicates the intra/inter decision by a to prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. As a non-limiting example, context-based adaptive binary arithmetic coding (CABAC) can be used to encode syntax elements into the bitstream.

To encode with CABAC, a non-binary syntax element value is mapped to a binary sequence, called a bin string, through a binarization process. For a bin, a context model is selected. A "context model" is a probability model for one or more bins and is chosen from a selection of available models depending on the statistics of recently coded symbols. The context model of each bin is identified by a context model index (also used as "context index"), and different context indices correspond to different context models. The context model stores the probability of each bin being '1' or '0', and can be adaptive or static. The static model triggers a coding engine with an equal probability for bins '0' and '1'. In the adaptive coding engine, the context model is updated based on the actual coded value of a bin. The operation modes corresponding to the adaptive and static models are called the regular mode and the bypass mode, respectively. Based on the context, a binary arithmetic coding engine encodes or decodes a bin according to the corresponding probability model.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
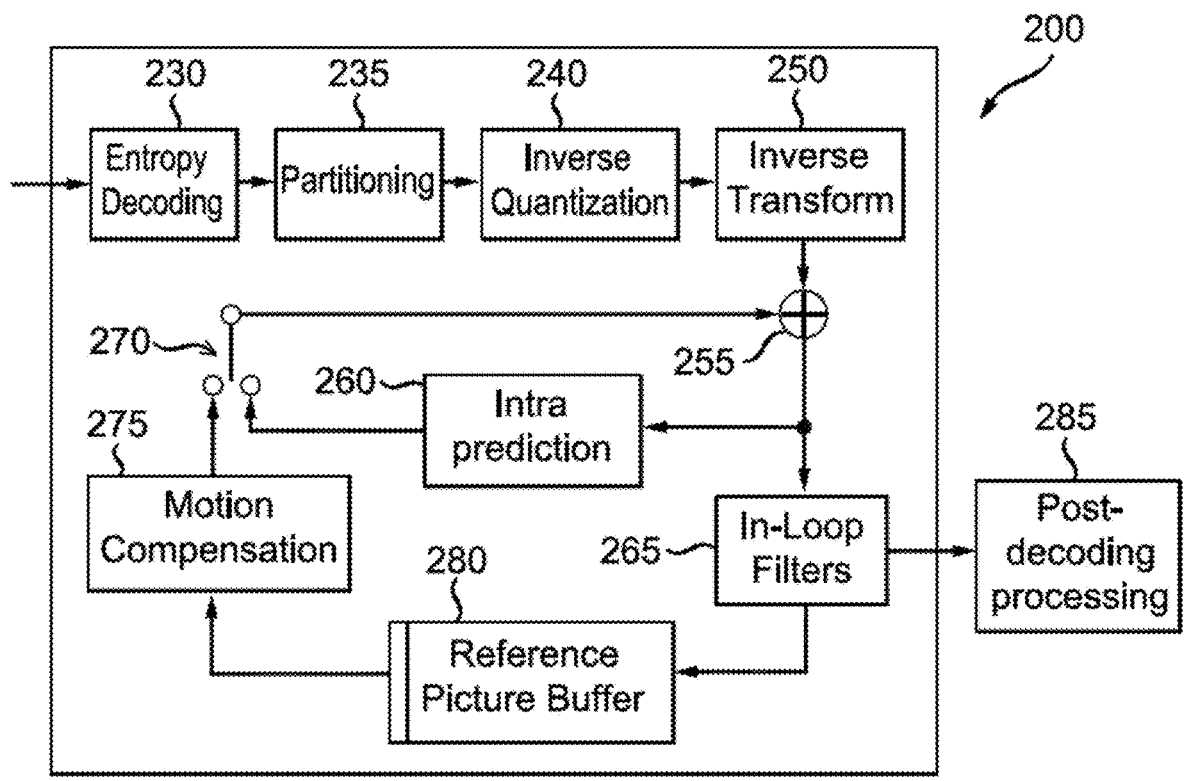
FIG. 2 illustrates a block diagram of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder, In particular, the input of the decoder includes a video bitstream, which may be generated by video encoder 100. The bitstream is first entropy decoded (230) to obtain transform coefficients, motion vectors, picture partitioning information, and other coded information. If CABAC is used for entropy coding, the context models are initialized in the same manner as the encoder context models, and syntax elements are decoded from the bitstream based on the context models.

The picture partitioning information indicates how the picture is partitioned, for example, the size of the CTUs, and a manner a CTU is split into CUs, and possibly into PUs when applicable. The decoder may therefore divide (235) the picture, for example, into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g, conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
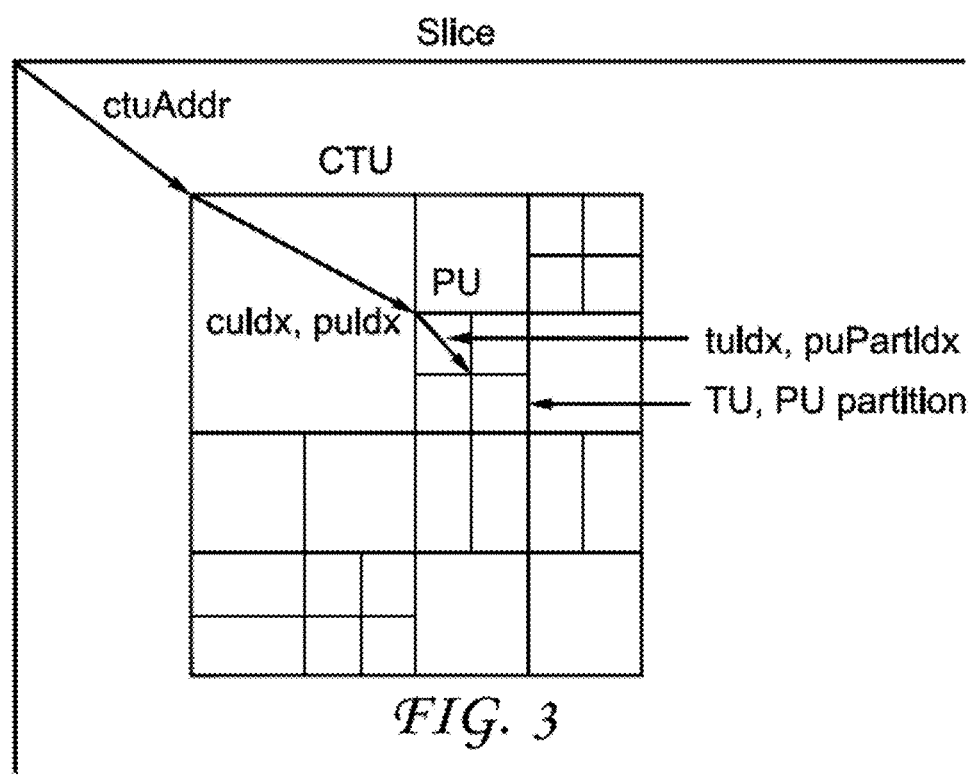
FIG. 3 is a pictorial example depicting the partitions.

As described above, in HEVC, encoding of a frame of a video sequence is based on a block structure, for example, as shown in FIG. 3. To encode the quantized transform coefficients, a transform block is divided into 4×4 sub-blocks of quantized coefficients called Coding Group (CG). An example of the coding groups (CGs) contained in an 8×8 TB is illustrated in FIG. 4.

Transform coefficient coding in HEVC involves several components: scanning, last significant coefficient coding, significance map coding, coefficient level coding and sign data coding.

The entropy coding/decoding goes through several scanning passes. Three different scan patterns are available for scanning the transform coefficients in the TB: diagonal, horizontal, and vertical, as shown in FIG. 4A, FIG. 4B and FIG. 4C, respectively. For inter blocks, the diagonal scanning is always used, while for 4×4 and 8×8 intra block, the scanning order depends on the intra prediction mode active for that block.

A scan pass over a TB processes each CG sequentially according to one of the three scanning orders, and the 16 coefficients inside each CG are scanned according to the considered scanning order as well. A scan pass, as defined in the scanning patterns, starts at the last significant coefficient in the TB, sweeps through high frequency coefficients to low frequency ones, and processes all coefficients until the DC coefficient.

The entropy coding of transform coefficient levels may be separated into five scan passes, respectively dedicated to the coding of the syntax elements in the following:

significant-coeff-flag: a significant-coefficient flag (also denoted as a significance flag), indicating significance (zero/non-zero) of a coefficient.

coeff-abs-level-greater1-flag: indicates if the absolute value of a coefficient level is greater than 1.

coeff-abs-level-greater2-flag: indicates if the absolute value of a coefficient level is greater than 2.

coeff-sign-flag: sign of a significant coefficient (0: positive, 1: negative).

coeff-abs-level-remaining: remaining value for the absolute value of a coefficient level (if value is larger than that coded in previous passes).

In each scan pass, a syntax is coded only when necessary as determined by the previous scan passes. For example, if the significant-coeff-flag of a coefficient is zero, the remaining scan passes for encoding the absolute value of that coefficient are not necessary. Same for the sign coding: the coeff-sign-flag is sent only for non-zero coefficient.

All scan passes are coded for a given CG until all the quantized coefficients in that CG can be reconstructed, before processing the next CG.

At the decoder side, the overall TB parsing process includes the following steps:
1. Decode the Last Significant Coordinate represented by the following syntax elements: last_sig_coeff_x_prefix, last_sig_coeff_y_prefix, last_sig_coeff_x_suffix, and last_sig_coeff_y_suffix.

This provides the decoder with the spatial position y-coordinates) of the last non-zero coefficients in the whole TB.

Then for each successive CG from the CG containing the last significant coefficient in the TB to the top-left CG in the TB, the following steps apply:
2. Decode the CG significance flag, which is called coded_sub_block_flag in the HEVC specification.
3. Decode the significant-coefficient flag for each coefficient in the considered CG. This corresponds to the syntax element sig_coeff_flag in the HEVC spec. This indicates which coefficient is non-zero in the CG.

Next parsing stages aim at the coefficient levels, for coefficients known as non-zero in the considered CG. They involve the following syntax elements:
4. coeff_abs_level_greater1_flag: this flag indicates if the current coefficient's absolute value is higher than 1 or not. If not, the absolute value is equal to 1.
5. coeff_abs_level_greater2_flag: this flag indicates if the current coefficient's absolute value is higher than 2 or not. If not, the absolute value is equal to 2.
6. coeff_sign_flag: this indicates the sign of the non-zero coefficients.
7. coeff_abs_level_remaining: this indicates the absolute value of the coefficient higher than 2 in absolute value.

The bins of syntax elements sig_coeff_flag, coeff_abs_level_greater1_flag and coeff_abs_level_greater2_flag are coded in the regular mode. Correlation between magnitudes of adjacent coefficients is exploited via the context-based probability models to improve compression efficiency.

In JEM, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

JEM, the context modeling for regular bins is different from HEVC, as described in an article entitled "Algorithm Description of Joint Exploration Test Model 3", Document JVET-C1001_v3, joint Video Exploration Team of ISO/IEC JTC1/SC29/WG11, 3$^{rd}$ meeting, 26 May-1 Jun. 2015, Geneva, CH. In particular, when coding one of the three syntax elements (i.e., syntax elements sig_coeff_flag, coeff_abs_level_greater1_flag and coeff_abs_level_greater2_flag) as described above, the context model index for a particular coefficient is dependent on the particular coefficient's position in the TB.

To capture the characteristics of transform coefficients at different frequencies, one TB is split into up to three regions, and the coefficients inside the same region share the same context model index set. The splitting method is fixed regardless of the TB size, as illustrated in FIG. 5. Each TB is split into three regions marked with different colors, and the context indices assigned to each region are shown. For example, the first region (top-left part of the TB) is assigned the context indices 12 to 17.

Figure 6:
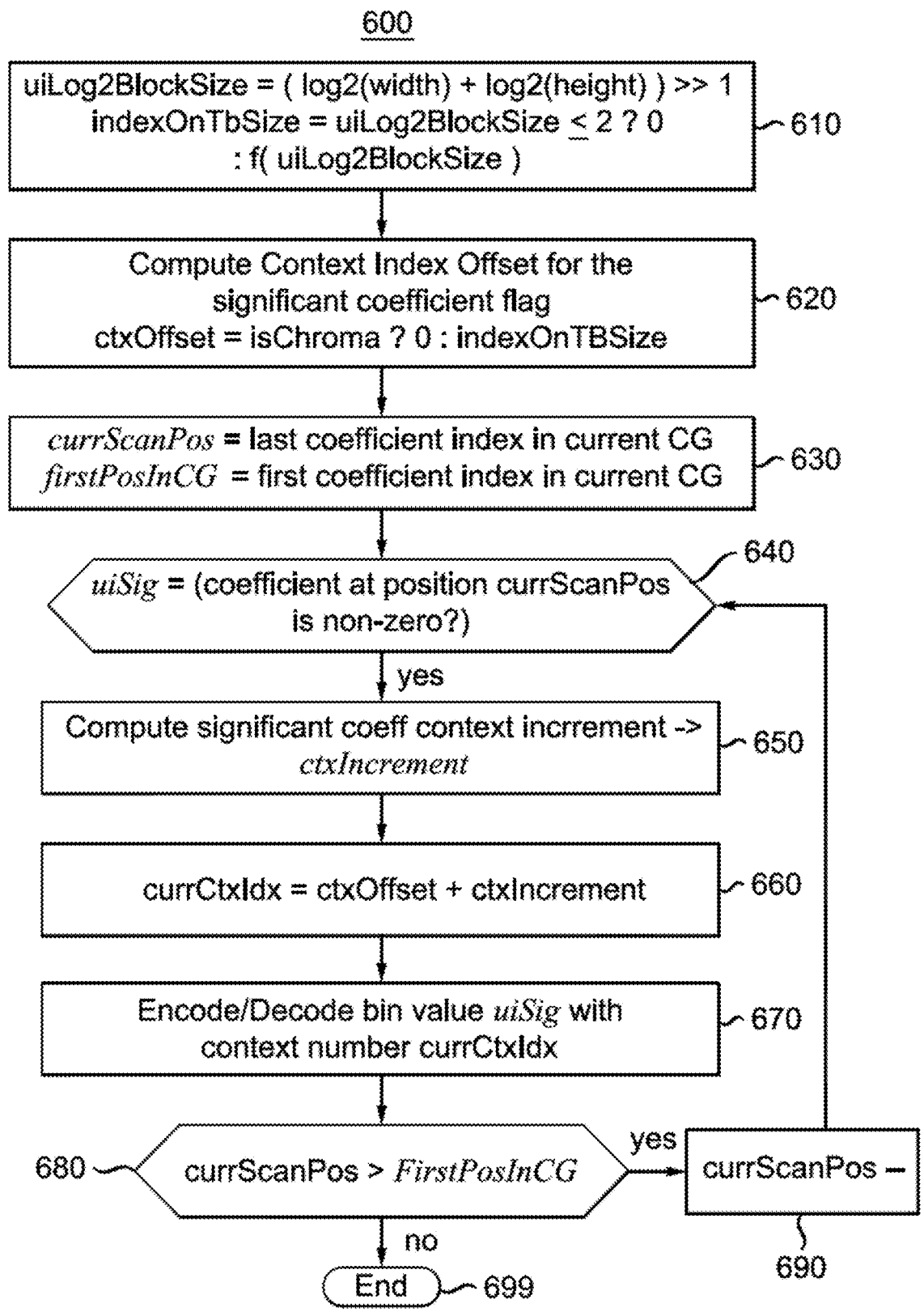
FIG. 6 is an exemplary method of encoding or decoding the significant-coefficient flags, according to an embodiment.

FIG. 6 illustrates an exemplary method 600 of coding the significant-coefficient flag in JEM. Process 600 can be applied at the encoder or decoder side. The inputs to process 600 are the transform block to encode, the size of the transform block (width, height), and the current Coding Group currCG in the considered TB. Steps 610 and 620 of the process aim at computing the base context index used to encode the significant-coefficient flag. As shown in FIG. 5, the context index depends on the TB size, more precisely, on the TB area. Particularly, the following value is calculated:

$$ui \operatorname{Log} 2 \text{BlockSize} = (\log 2(\text{width}) + \log 2(\text{height})) \gg 1 \tag{1}$$

If the Luma component is processed in the current TB, then the set of contexts used to code the significant-coefficient flag is set (610) as a function of the value of uiLog2BlockSize:

$$\text{indexOn} TbSize = ui \operatorname{Log} 2\text{BlockSize} \leq 2?0 : f(ui \operatorname{Log} 2\text{BlockSize}) \tag{2}$$

where f( ) is a defined look-up function:

$$f(ui \operatorname{Log} 2BlkSize) = \begin{cases} 18 & \text{if } (ui\operatorname{Log} 2BlkSize = 3) \\ 36 & \text{if } (ui\operatorname{Log} 2BlkSize \geq 4) \end{cases}.$$

Consequently, separated sets of CABAC contexts are employed to code the significant-coefficient flag of TB with different areas.

These different sets of contexts are represented (620) by the context address ctxOff set in a global set of contexts useful for the coding of the significant-coefficient flag. For the chroma component, ctxOff set is set (620) to 0.

The coding process then loops over each coefficient in the current coding group of the current TB, from the last coefficient towards the lowest frequency coefficient (630). At step 640, a variable, uiSig, is used to indicate the significance of the current coefficient. For a non-zero coefficient, a context index for the coding of its significance is computed. In particular, a context increment is calculated (650), and the context index is obtained (660) as the sum of the base context index and the increment. Once the context index for current coefficient is obtained, its significance bin, represented by variable uiSig is arithmetically encoded or decoded (670) using the probability model corresponding to the context index. The process is over once the loop reaches the coefficient with lowest frequency in the current CG (680, 690). Process 600 ends at step 699.

The context increment computation (650) depends on the context region and on the values of the significant-coefficient flags of previously coded coefficients in the neighborhood covered by a local template. In an example as shown in FIG. 5, a TB is divided into three context regions, and while X corresponds to the current coefficient to process, coefficients $x_0, \ldots x_4$ correspond to the coefficients forming the local template.

Figure 7:
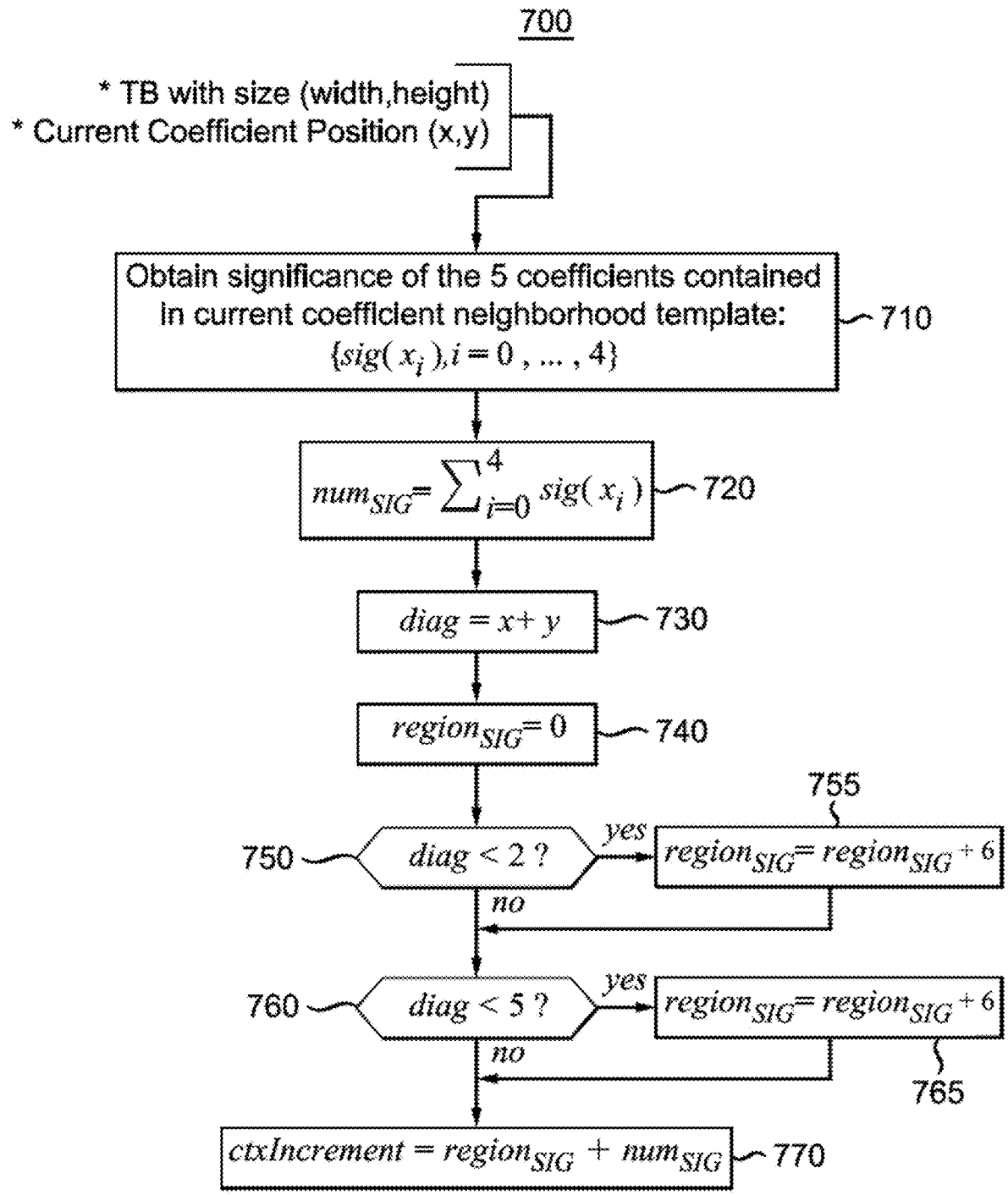
FIG. 7 is an exemplary method of encoding a significant-coefficient flag in JEM.

FIG. 7 illustrates an exemplary method 700 of calculating the context index increment. Method 700 can be used in step 650 of method 600. Here, the context increment is determined based on the context region and the sum of the significance flags of neighboring coefficients (710).

Mathematically, the context increment associated with a transform coefficient X at position (x, y) is computed as:
  The number of significant coefficients in the template (i.e., the set of neighboring coefficients $(x_0, \ldots, x_4)$) is computed (720): $num_{SIG}=\sum_{i=0}^{4}sig(x_i)$, where $sig(x_i)$ is the significance of coefficient $x_i$.

The index of the diagonal to which coefficient X belongs to is computed (730) as the sum of its coordinates:

$$diag=posX(X)+poxY(X) \quad (3)$$

The region which coefficient X belongs to is decided (740, 750, 755, 760, 765) by comparing diag with pre-defined thresholds:

$$region_{SIG}=(diag<2?6: 0)+(diag<5?6: 0) \quad (4)$$

Finally, the context increment for current coefficient X is computed (770) as:

$$ctxIncrement=region_{SIG}+num_{SIG} \quad (5)$$

Luma and Chroma components are treated in a similar way but with separate sets of context models.

The above scheme used in JVET is based on the assumption that spatial transforms compact energy towards lower frequency coefficients, and the context region splitting that follows a descending order of the likelihood of significant coefficients provides more accurate probability modeling. However, these context regions are not always adaptive to the actual is signal statistics.

In the following, several embodiments that modify the context increment computation are described. In general, the present embodiments are directed to encoding and decoding of the significant-coefficient flags and other syntax elements, such as the greater-than-1 or greater-than-2 flags. In one embodiment, the context regions used for CABAC model index selection are modified in order to adapt to the signal statistics. The proposed techniques may more efficiently select CABAC context model indices for encoding transform coefficients, and therefore may provide a good compression efficiency with a small complexity increase.

In the following, several embodiments of context-based encoding of these syntax elements are described. Because the statistics of the coefficient levels may differ across the video sequences, the context used to encode the syntax elements associated with the transform coefficients can be determined as a function of the significance statistics of the blocks. Therefore, some adaptations of the context region design are brought to the encoding and decoding of these syntax elements.

To understand the variations in signal statistics, the quantized coefficients of 8×8 blocks from different video sequences are collected. It should be noted that 8×8 blocks are used as a non-limiting example, and the present techniques can be applied to other block sizes. The non-zero probability at each frequency position is visualized in FIG. 8 for two exemplary video sequences. The distributions are different between these two different video sequences, which motivates us to design adaptive context regions to the statistics.

As described above, for JEM, the context region that the coefficient X belongs to is decided by comparing the sum of its coordinates (x, y) with pre-defined thresholds as described in Eq. (4). Applying the JEM scheme to the videos used in FIG. 8, the context regions are shown in FIG. 9. As can be seen in this example, the non-zero probability of the coefficients of sequence BasketballDrive_1920×1080_50 decreases quickly along the horizontal direction. If the fixed diagonal context region is applied, some bins with different non-zero probabilities will share the same context sets, which might decrease the efficiency.

In order to adapt to the video sequence, rather than using the frequency position as in JEM, non-zero probability statistics and several pre-defined probability thresholds can be employed to decide the context region a transform coefficient belongs to. In order not to introduce significant overhead, a moving window estimation scheme can be applied, where is both the encoder and decoder estimate current frame's probabilities using statistics from previously coded frames.

The significance probability estimation process can proceed as follows:

1. When coding previously coded frame (i−1), count the non-zero coefficient appearance C[i−1][y][x] at frequency position (x, y) of the given TB size, as well as the TB number M. The observed non-zero probability of the TBs in frame (i−1), in the display order or in the decoding order, can be obtained by:

$$P_c[i-1][y][x]=C[i-1][y][x]/M \quad (6)$$

2. For the first encoded frame 0, there is no estimated non-zero probability from previous frames. In one example, we can use some pre-determined probability for frame 0. As for other frames, the estimated non-zero probability can be obtained using update rate k to control the update brought by the observed non-zero probability $P_c[i-1][y][x]$:

$$P_e[i][y][x]=(1-k)*P_e[i-1][y][x]+k*P_c[i-1][y][x], i\geq 1 \quad (7)$$

The value of update rate k can be different depending on the slice type of the previous frame. For example, k=½ when the previous frame is I slice due to the content can change a lot, k=¼ when the previous frame is P slice, and k=⅛ for B In another embodiment, the non-zero probability can be estimated using the quantization parameters. Usually, if the current frame's QP ($QP_i$) is larger than the previous frame's QP ($QP_{i-1}$), more coefficients are more likely to be zero; and if the QP becomes smaller, the non-zero probability increases. Thus, in one example, we can use the scaling factor associated with QP:

$$P_e[i][y][x] = P_c[i-1][y][x]*\frac{QP_{i-1}}{QP_i} \quad (8)$$

In other embodiments, the non-zero probability statistics can be collected not only by the TB size, but also other parameters, such as coding modes (inter or intra), prediction modes, and EMT indices.

Using the estimated non-zero probability, or more generally the statistics of the transform coefficients, different techniques are developed to split context regions for the assignment of CABAC contexts, which are used to encode/decode the transform coefficient information, such as the significance information.

In a first embodiment, the context region that the coefficient X belongs to is decided by comparing the estimated non-zero probability $P_e[y][x]$ at its coordinates (x, y) with pre-defined threshold:

$$region_{SIG}=(P_e[i][y][x]<P_{th1}?6:0)+(P_e[i][y][x]<P_{th2}?6: 0) \quad (8)$$

where $P_{th1}$ and $P_{th2}$ are the pre-defined thresholds for Region 1 and Region 2, respectively. The values of $P_{th1}$ and $P_{th2}$ can be determined experimentally. For example, after generating and analyzing the probability over several JVET test sequences, $P_{th1}=0.3$ and $P_{th2}=0.2$ can be used in one embodiment. The pre-defined threshold values can be varied to adapt to different TB sizes and sequences contents. It should be noted that Region 1 or Region 2 may be just a set of points which do not necessarily form a connected region. In some extreme cases, a region may only contain one point.

Figure 10:
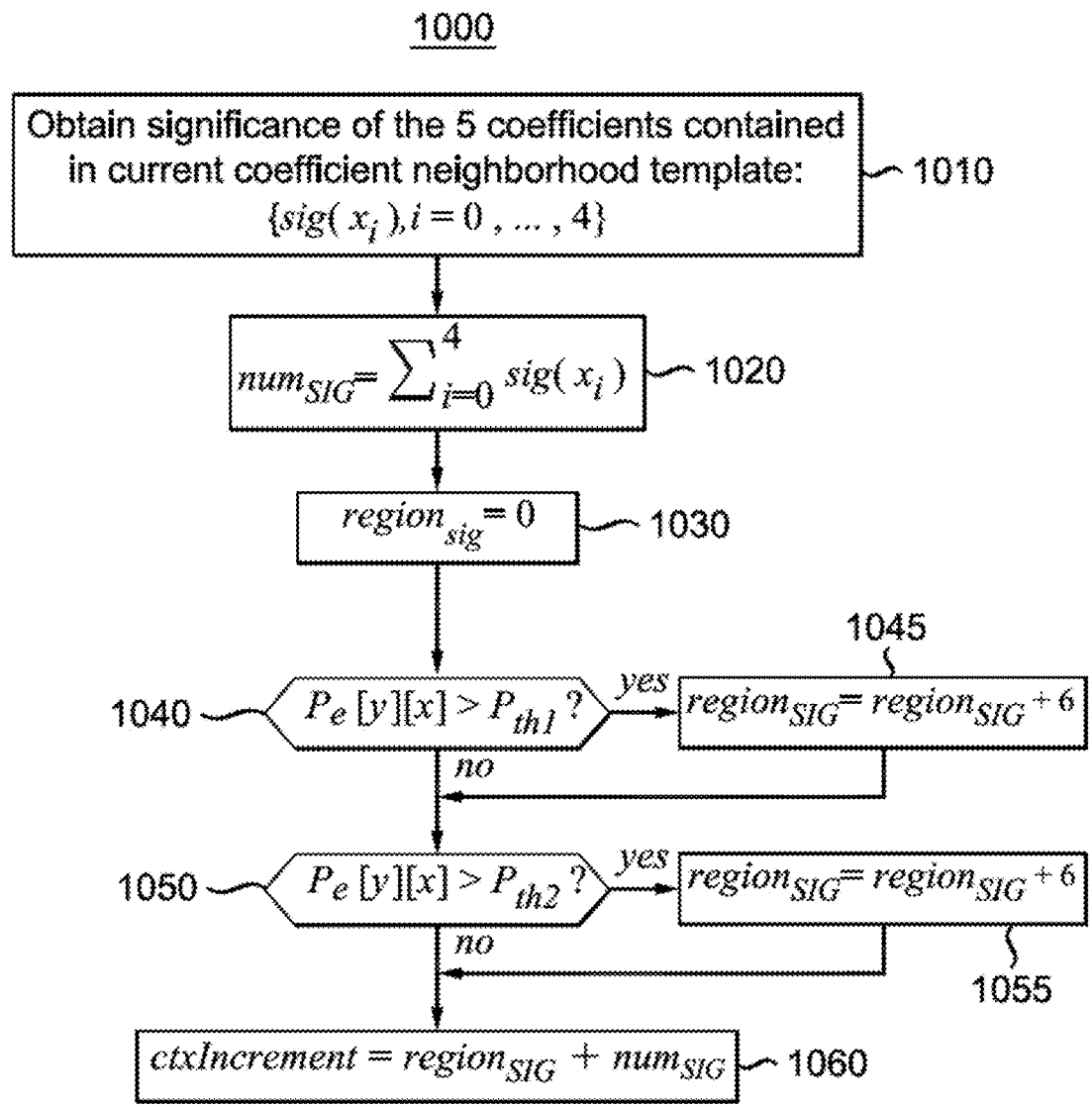
FIG. 10 illustrates an exemplary method of computing the context increment value, according to a first embodiment.

FIG. 10 illustrates an exemplary method 1000 for computing the context increment that adapts the context region to the non-zero probability statistics, according to the first embodiment. Method 1000 can be used at both the encoder and decoder. Method 1000 can be used in step 650 of method 600. The inputs to method 1000 include the block size of the current TB, the current transform coefficient position (x, y) in the current TB, and the estimated non-zero probability of the coefficient position $P_e[y][x]$. Steps 1010, 1020 and 1060 are performed similarly to steps 710, 720 and 770 of method 700, respectively. In steps 1030-1055, rather than setting the region index based on the coefficient position as in method 700, method 1000 determines the context region based on the transform coefficient statistics, for example, using Eq. (8).

Figure 8:
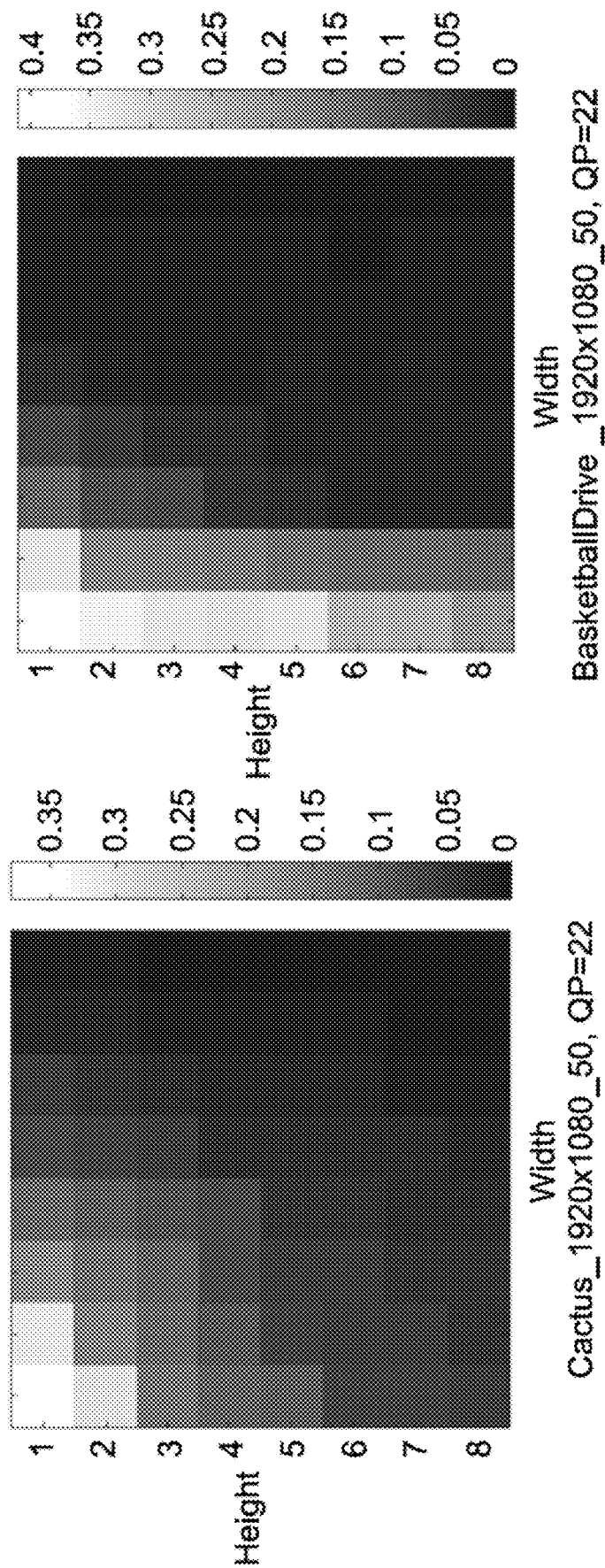
FIG. 8 is a pictorial example depicting non-zero probability distributions in 8×8 blocks of two different sequences.
Figure 9:
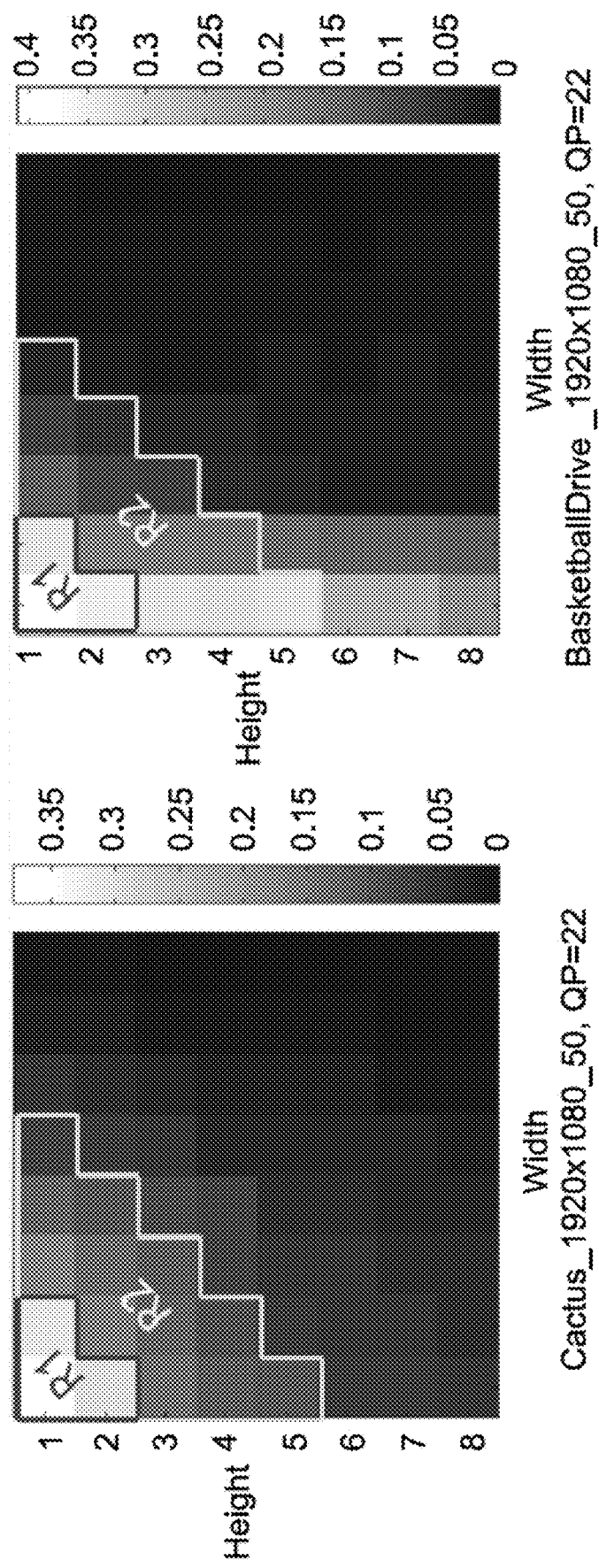
FIG. 9 is a pictorial example depicting context regions for 8×8 transform blocks.
Figure 11:
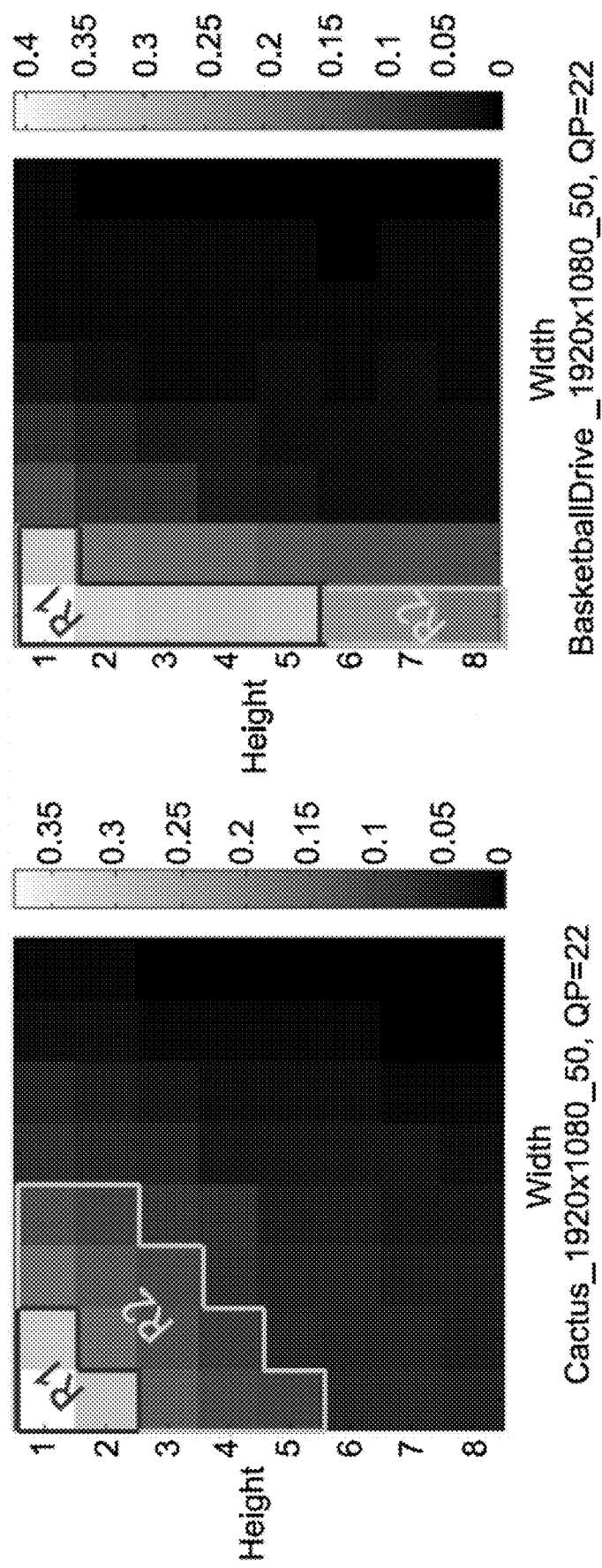
FIG. 11 is a pictorial example depicting context regions for 8×8 transform blocks, according to the first embodiment.

Applying method 1000 to the videos used in FIG. 8 and FIG. 9, the obtained context regions are illustrated in FIG. 11, with respect to block size 8×8. It is noted that the context region is modified dynamically according to the significance statistics compared to the one as shown in FIG. 9. Particularly for this example, the context set of Region R1 is not only used for the fixed top parts as depicted in FIG. 9, but also applied to the coefficients in the first column of the block with estimated non-zero probability $P_e[y][x]>P_{th1}$; and the context Region R2 is not solely relied on the frequency position of the coefficient but based on $P_e[y][x]>P_{th2}$. Indeed, the conditional entropy of encoding the significance is lower as bins using the same context are more correlated. Because of the improvement in the choice of context, the rate cost of coding the bin may be reduced, and potential bit decrease can be expected.

In a second embodiment, the signal statistics is used to create more sets of contexts. In particular, the position information is used to initially assign the CABAC contexts, and the probability statistics is used to separate the assigned context.

Figure 12:
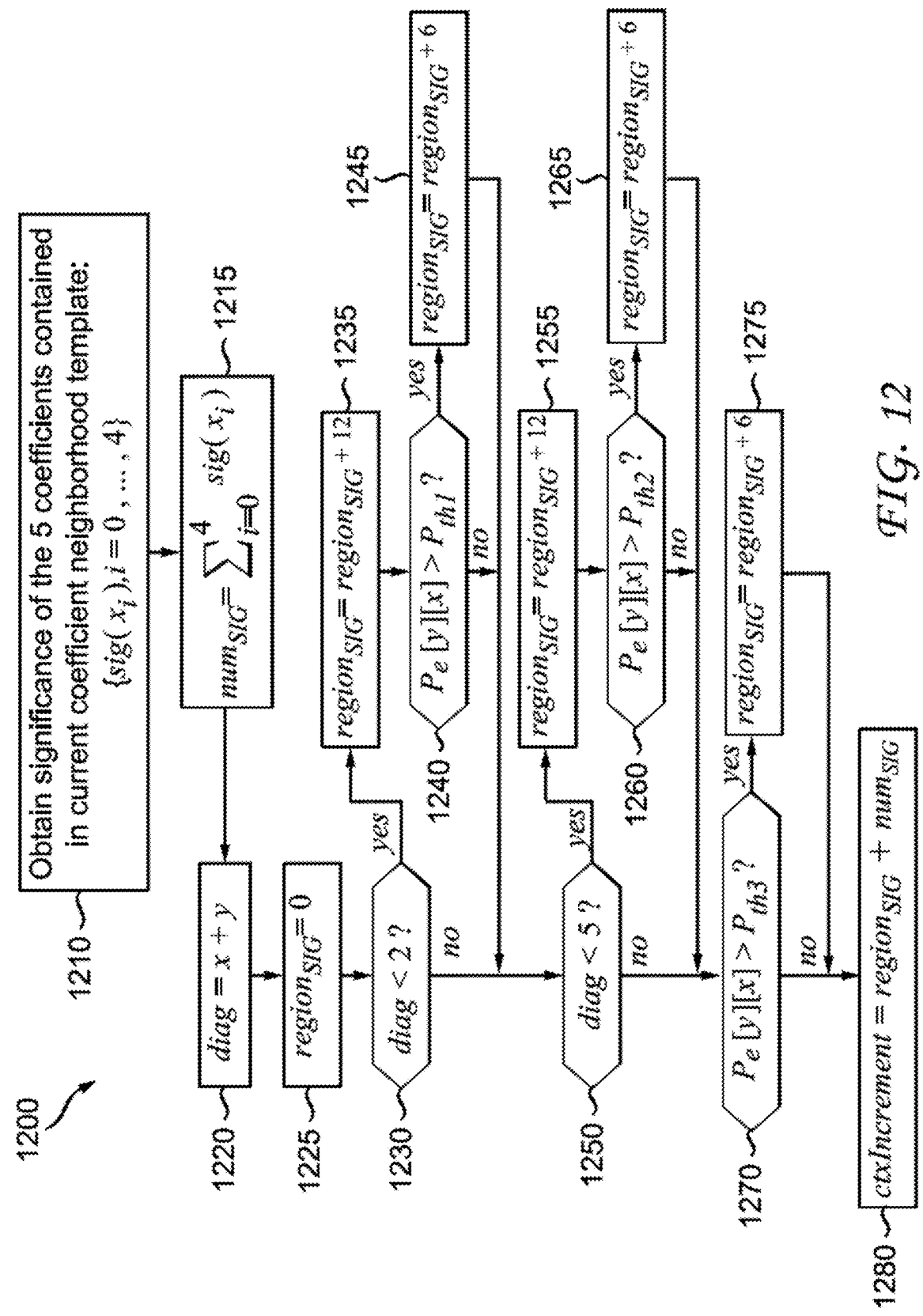
FIG. 12 illustrates an exemplary method of computing the context increment value, according to a second embodiment.

FIG. 12 illustrates an exemplary method 1200 for using the position information and signal statistics to calculate the context increment, according to the second embodiment. Method 1200 can be used at both the encoder and decoder. Method 1200 can be used in step 650 of method 600.

The inputs to method 1200 include the block size of the current TB, the current transform coefficient position (x, y) in the current TB, and the estimated non-zero probability of the coefficient position $P_e[y][x]$. Steps 1210, 1215 and 1220 are performed similarly to steps 710, 720 and 730 of method 700, respectively. At step 1225, the context increment is initialized as 0 (i.e., $region_{SIG}=0$).

At step 1230, the encoder or decoder checks if diag<2. If yes, then $region_{SIG}$ is incremented (1235) by 12. The encoder or decoder further checks (1240) whether the non-zero probability is greater than a first threshold, i.e., if $P_e[y][x]>P_{th1}$. If yes, $region_{SIG}$ is incremented (1245) by 6. At step 1250, the encoder or decoder checks if diag<5. If yes, then $region_{SIG}$ is incremented (1255) by 12. The encoder or decoder further checks (1260) whether the non-zero probability is greater than a second threshold, i.e., if $P_e[y][x]>P_{th2}$. If yes, $region_{SIG}$ is incremented (1265) by 6. At step 1270, the encoder or decoder checks (1270) whether the non-zero probability is greater than a third threshold, i.e., if $P_e[y][x]>P_{th3}$. If yes, $region_{SIG}$ is incremented (1275) by 6. At step 1280, the context increment from the position and statistical information ($region_{SIG}$) is added to the context increment from the template ($num_{SIG}$) to obtain the context increment for the current transform coefficient.

Figure 13:
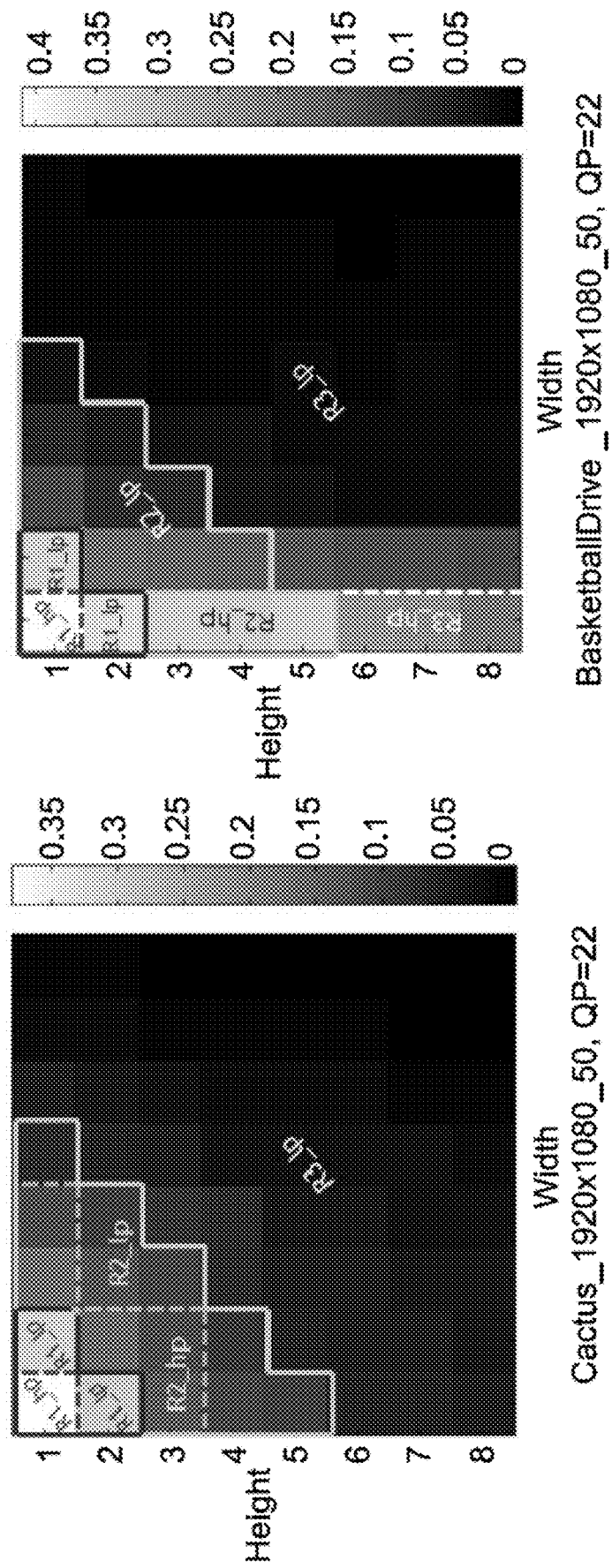
FIG. 13 is a pictorial example depicting context regions for 8×8 transform blocks, according to the second embodiment.

Thus, the coefficients' coordinate information is used to assign the initial context regions. In addition, the second embodiment tests if the estimated probability at the coordinate where the current coefficient is located is higher than a pre-defined probability threshold in each region. If yes, then the context index is being incremented by 6. As the results of these changes in context assignments:

Each region is further spilt into 2 sub-regions: low-probability and high-probability region as shown in FIG. 13;

Instead of 6 context indices, 12 context indices are employed per region. Specifically, sub-regions R1_hp and R1_lp together correspond to R1 in FIG. 9, R2_hp and R2_lp together correspond to R2 in FIG. 9, R3_hp and R3_lp together correspond to R3 in FIG. 9. R1_hp would use context indices from 30-35, R1_lp 24-29, R2_hp 18-23, R2_lp 12-17, R3_hp 6-11, and R3_lp 0-5.

By using both the position and statistical information, the second embodiment assigns CABAC contexts that are more correlated to the probability statistics, and also can avoid some extreme region splitting (i.e. one context region only contains one coefficient) by using the position information as a constraint.

Both the first and second embodiments provide improvement in calculating the context increment. As shown in FIG. 6, the context increment can be added to the base context index to obtain the actual context index for entropy coding. More generally, the context increment can be seen as a mechanism to adjust the context index, and can be applied alone, or when other methods of obtaining the base context index are used.

In the above examples as shown in FIG. 11 or FIG. 13, three regions are used. In other embodiments, the proposed context region adjustment can increase or decrease the number of regions, for example, by adding or removing the pre-defined probability thresholds. Further, context region adjustment can increase or decrease the number of sub-regions in each region by adding or removing the pre-defined probability thresholds.

The above methods are described mainly with respect to the context index design for entropy encoding or decoding the syntax element associated with the significance flag. However, the proposed techniques can also be performed for the coding of other syntax elements associated with transform coefficients, such as coeff_abs_level_greater1_flag and coeff_abs_level_greater2_flag syntax element, which will be based on greater-than-one and greater-than-two probability, respectively. More generally, the present techniques can be applied to code syntax elements that indicate whether an absolute value of a quantized transform coefficient is greater than X, X being 0, 1, 2, 3 or another value.

The present embodiments can be applied to other entropy coding methods based on context modelling, to assist in assigning context indices to the coefficients.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of transform coefficients used in the template, the number regions or sub-regions, and several thresholds. It should be noted that the specific values are for exemplary purposes and the present embodiments are not limited to these specific values.

The above methods of entropy coding can be used to modify the entropy coding module (145, 230) of the JVET or HEVC encoder and decoder as shown in FIG. 1 and FIG. 2. Moreover, the present embodiments are not limited to JVET or HEVC, and can be applied to other standards, recommendations, and extensions thereof. Various embodiments described above can be used individually or in combination. For example, the present embodiments can be used when other scan patterns or other partitioning methods are used. While the methods are described above with the template (x1-x4) as in JEM. It should be noted that the methods are independent of the templates, and can be used without the template or with other templates.

Figure 14:
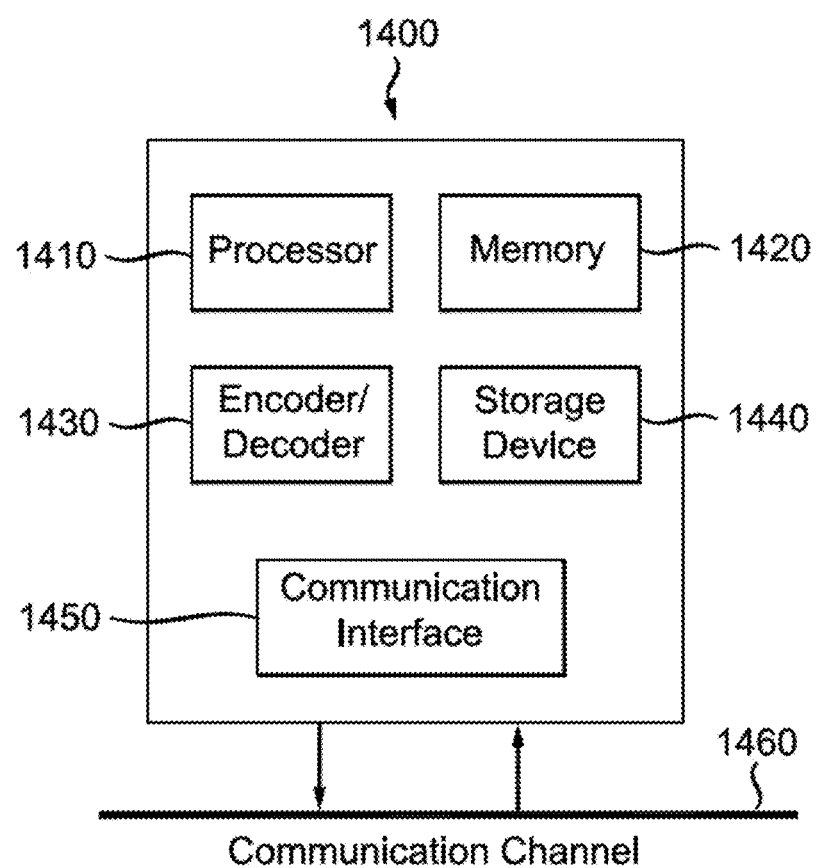
FIG. 14 illustrates a block diagram of a system within which aspects of the present embodiments can be implemented.

FIG. 14 illustrates a block diagram of an exemplary system 1400 in which various aspects of the exemplary embodiments may be implemented. The system 1400 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1400 may be communicatively coupled to other similar systems, and to a display via a communication channel as shown in FIG. 14 and as known by those skilled in the art to implement all or part of the exemplary video systems described above.

Various embodiments of the system 1400 include at least one processor 1410 configured to execute instructions loaded therein for implementing the various processes as discussed above. The processor 1410 may include embedded memory, input output interface, and various other circuitries as known in the art. The system 1400 may also include at least one memory 1420 (e.g., a volatile memory device, a non-volatile memory device). The system 1400 may additionally include a storage device 1440, which may include non-volatile memory, including, but not limited to, EEPROM, ROM, PROM, RAM, DRAM, SRAM, flash, magnetic to disk drive, and/or optical disk drive. The storage device 1440 may comprise an internal storage device, an attached storage device, and/or a network accessible storage device, as non-limiting examples. The system 1400 may also include an encoder/decoder module 1430 configured to process data to provide encoded video and/or decoded video, and the encoder/decoder module 1430 may include its own processor and memory.

The encoder/decoder module 1430 represents the module(s) that may be included in a device to perform the encoding and/or decoding functions. As is known, such a device may include one or both of the encoding and decoding modules. Additionally, the encoder/decoder module 1430 may be implemented as a separate element of the system 1400 or may be incorporated within one or more processors 1410 as a combination of hardware and software as known to those skilled in the art.

Program code to be loaded onto one or more processors 1410 to perform the various processes described hereinabove may be stored in the storage device 1440 and subsequently loaded onto the memory 1420 for execution by the processors 1410. In accordance with the exemplary embodiments, one or more of the processor(s) 1410, the memory 1420, the storage device 1440, and the encoder/decoder module 1430 may store one or more of the various items during the performance of the processes discussed herein above, including, but not limited to the input video, the decoded video, the bitstream, equations, formulas, matrices, variables, operations, and operational logic.

The system 1400 may also include a communication interface 1450 that enables communication with other devices via a communication channel 1460. The communication interface 1450 may include, but is not limited to a transceiver configured to transmit and receive data from the communication channel 1460. The communication interface 1450 may include, but is not limited to, a modem or network card and the communication channel 1450 may be implemented within a wired and/or wireless medium. The various components of the system 1400 may be connected or communicatively coupled together (not shown in FIG. 14) using various suitable connections, including, but not limited to internal buses, wires, and printed circuit boards.

The exemplary embodiments may be carried out by computer software implemented by the processor 1410 or by hardware, or by a combination of hardware and software. As a non-limiting example, the exemplary embodiments may be implemented by one or more integrated circuits. The memory 1420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1410 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
obtaining a probability of a quantized transform coefficient, of a block of a picture, being zero or non-zero, based on statistics of transform coefficients of at least a previous picture, wherein said probability is obtained further responsive to a scaling factor that is based on a ratio of a quantization parameter of said at least a previous picture and a quantization parameter of said picture;
determining a context model for a syntax element associated with said quantized transform coefficient, responsive to said probability and a position of said quantized transform coefficient;
entropy decoding said syntax element based on said context model; and
decoding said quantized transform coefficient responsive to said decoded syntax element.

2. The method of claim 1, wherein said context model is determined responsive to a comparison of (1) a sum of x-coordinate and y-coordinate of said quantized transform coefficient in said block and (2) at least a threshold value.

3. The method of claim 2, wherein said block is divided into a plurality of context regions based on positions of transform coefficients of said block, wherein a context region of said plurality of context regions is divided into two or more sub-regions based on probabilities of transform coefficients in said region, and wherein each sub-region shares a same set of context model indices.

4. The method of claim 1, wherein said probability is obtained based on statistics of blocks, at a same size as said block, in said at least a previous picture.

5. The method of claim 1, wherein said probability is collected by at least one of (1) a size of said block, (2) a coding mode of said block; and (3) a prediction mode of said block.

6. A method for video encoding, comprising:
accessing a quantized transform coefficient of a block of a picture in a video;
obtaining a probability of said quantized transform coefficient being zero or non-zero, based on statistics of transform coefficients of at least a previous picture, wherein said probability is obtained further responsive to a scaling factor that is based on a ratio of a quantization parameter of said at least a previous picture and a quantization parameter of said picture;
determining a context model for a syntax element associated with said quantized transform coefficient, responsive to said probability and a position of said quantized transform coefficient; and
entropy encoding said syntax element based on said context model.

7. The method of claim 6, wherein said context model is determined responsive to a comparison of (1) a sum of x-coordinate and y-coordinate of said quantized transform coefficient in said block and (2) at least a threshold value.

8. The method of claim 7, wherein said block is divided into a plurality of context regions based on positions of transform coefficients of said block, wherein a context region of said plurality of context regions is divided into two or more sub-regions based on probabilities of transform coefficients in said region, and wherein each sub-region shares a same set of context model indices.

9. An apparatus for decoding video data, comprising at least a memory and one or more processors, wherein said one or more processors are configured to:
obtain a probability of a quantized transform coefficient, of a block of a picture, being zero or non-zero, based on statistics of transform coefficients of at least a previous picture, wherein said probability is obtained further responsive to a scaling factor that is based on a ratio of a quantization parameter of said at least a previous picture and a quantization parameter of said picture;
determine a context model for a syntax element associated with said quantized transform coefficient, responsive to said probability and a position of said quantized transform coefficient;
entropy decode said syntax element based on said context model; and
decode said quantized transform coefficient responsive to said decoded syntax element.

10. The apparatus of claim 9, wherein said context model is determined responsive to a comparison of (1) a sum of x-coordinate and y-coordinate of said quantized transform coefficient in said block and (2) at least a threshold value.

11. The apparatus of claim 10, wherein said block is divided into a plurality of context regions based on positions of transform coefficients of said block, wherein a context region of said plurality of context regions is divided into two or more sub-regions based on probabilities of transform coefficients in said region, and wherein each sub-region shares a same set of context model indices.

12. The apparatus of claim 9, wherein said probability is obtained based on statistics of blocks, at a same size as said block, in said at least a previous picture.

13. The apparatus of claim 9, wherein said probability is collected by at least one of (1) a size of said block, (2) a coding mode of said block; and (3) a prediction mode of said block.

14. An apparatus for encoding video data, comprising at least a memory and one or more processors, wherein said one or more processors are configured to:
- access a quantized transform coefficient of a block of a picture in a video;
- obtain a probability of said quantized transform coefficient being zero or non-zero, based on statistics of transform coefficients of at least a previous picture, wherein said probability is obtained further responsive to a scaling factor that is based on a ratio of a quantization parameter of said at least a previous picture and a quantization parameter of said picture;
- determine a context model for a syntax element associated with said quantized transform coefficient, responsive to said probability and a position of said transform coefficient; and
- entropy encode said syntax element based on said context model.

15. The apparatus of claim 14, wherein said context model is determined responsive to a comparison of (1) a sum of x-coordinate and y-coordinate of said quantized transform coefficient in said block and (2) at least a threshold value.

16. The apparatus of claim 15, wherein said block is divided into a plurality of context regions based on positions of transform coefficients of said block, wherein a context region of said plurality of context regions is divided into two or more sub-regions based on probabilities of transform coefficients in said region, and wherein each sub-region shares a same set of context model indices.

17. The method of claim 6, wherein said probability is obtained based on statistics of blocks, at a same size as said block, in said at least a previous picture.

18. The method of claim 6, wherein said probability is collected by at least one of (1) a size of said block, (2) a coding mode of said block; and (3) a prediction mode of said block.

19. The apparatus of claim 14, wherein said probability is obtained based on statistics of blocks, at a same size as said block, in said at least a previous picture.

20. The apparatus of claim 14, wherein said probability is collected by at least one of (1) a size of said block, (2) a coding mode of said block; and (3) a prediction mode of said block.

* * * * *